(12) United States Patent
Beller et al.

(10) Patent No.: US 10,621,178 B2
(45) Date of Patent: *Apr. 14, 2020

(54) LEVERAGING EXTRACTED ENTITY AND RELATION DATA TO AUTOMATICALLY FILTER DATA STREAMS

(71) Applicant: International Business Machines Corporation, Armonk, NY (US)

(72) Inventors: Charles E. Beller, Baltimore, MD (US); William G. Dubyak, Severna Park, MD (US); Joshua G. Hong, Singapore (SG); Brian L. Keith, Leesburg, VA (US); Palani Sakthi, Palatine, IL (US); Kristen M. Summers, Takoma Park, MD (US)

(73) Assignee: International Business Machines Corporation, Armonk, NY (US)

( * ) Notice: Subject to any disclaimer, the term of this patent is extended or adjusted under 35 U.S.C. 154(b) by 100 days.

This patent is subject to a terminal disclaimer.

(21) Appl. No.: 15/625,402

(22) Filed: Jun. 16, 2017

(65) Prior Publication Data
US 2018/0276284 A1 Sep. 27, 2018

Related U.S. Application Data

(63) Continuation of application No. 15/467,289, filed on Mar. 23, 2017.

(51) Int. Cl.
*G06F 16/2455* (2019.01)
*G06F 16/25* (2019.01)
*G06F 16/36* (2019.01)

(52) U.S. Cl.
CPC ...... *G06F 16/24568* (2019.01); *G06F 16/254* (2019.01); *G06F 16/36* (2019.01)

(58) Field of Classification Search
CPC ... G06F 16/24568; G06F 16/36; G06F 16/254
See application file for complete search history.

(56) References Cited

U.S. PATENT DOCUMENTS

| 5,822,527 | A | 10/1998 | Post |
| 7,293,019 | B2 * | 11/2007 | Dumais ............... G06F 16/9535 707/754 |

(Continued)

OTHER PUBLICATIONS

Weisstein, Eric W. "Linear Combination." From MathWorld—Wolfram Web Resource. Accessed Jun. 19, 2019 from <http://mathworld.wolfram.com/LinearCombination.html> (Year: 2019).*

(Continued)

*Primary Examiner* — Robert W Beausoliel, Jr.
*Assistant Examiner* — Arthur Ganger
(74) *Attorney, Agent, or Firm* — Pepper Hamilton LLP

(57) ABSTRACT

Embodiments are directed to an entity extraction and filtering method that enables a close search of documents to build filters necessary for near real-time monitoring of streaming sources of information. According to an embodiment, the entity extraction and filtering method operates based on the following parameters. First, a detection of an entity of interest warrants flagging an arriving article for analyst attention. Nothing more than a match may be required. The list of entities may be derived by an entity extractor from a corpus of data. Secondly, automatic updates may be utilized, so that exports are automatically updated to the filters. Thirdly, information flowing past the filters may update a static corpus whether or not they are flagged for an analyst or user. This allows for new relationships to be detected and extracted, and the filters subsequently updated.

5 Claims, 4 Drawing Sheets

(56) References Cited

U.S. PATENT DOCUMENTS

| | | | |
|---|---|---|---|
| 7,730,085 B2 | 7/2010 | Hassan et al. | |
| 8,380,710 B1* | 2/2013 | Finne | G06F 16/24578 |
| | | | 707/723 |
| 8,504,490 B2 | 7/2013 | Nie et al. | |
| 8,874,558 B1* | 10/2014 | He | G06F 16/951 |
| | | | 707/723 |
| 9,477,758 B1* | 10/2016 | Tong | G06F 16/951 |
| 2006/0004866 A1* | 1/2006 | Lawrence | G06Q 10/0635 |
| 2011/0093464 A1* | 4/2011 | Cvet | G06F 16/355 |
| | | | 707/737 |
| 2012/0131139 A1* | 5/2012 | Siripurapu | G06F 16/951 |
| | | | 709/217 |
| 2015/0178273 A1* | 6/2015 | Hakkani-Tur | G06F 17/28 |
| | | | 704/9 |

OTHER PUBLICATIONS

Fischer, L. et al. (2015). Timely Semantics: A Study of a Stream-based Ranking System for Entity Relationships. International Semantic Web Conference, 429-445.

Frank, J.R. et al. (2014). Evaluating Stream Filtering for Entity Profile Updates in TREC 2012, 2013, and 2014 (KBA Track Overview, Notebook Paper). Massachusetts Inst of Tech.

Grainger, T. et al. (2016). The Semantic Knowledge Graph: A compact, auto-generated model for real-time traversal and ranking of any relationship within a domain. arXiv prepi.

Frank, J.R. et al. (2012). Building an Entity-Centric Stream Filtering Test Collection for TREC 2012. In Proceeding of the Twenty-First Text Retrieval Conference.

* cited by examiner

LEVERAGING EXTRACTED ENTITY AND RELATION DATA TO AUTOMATICALLY FILTER DATA STREAMS

CROSS REFERENCE TO RELATED APPLICATIONS

This application is a continuation of U.S. patent application Ser. No. 15/467,289, filed on Mar. 23, 2017, the entirety of which is hereby incorporated by reference herein.

STATEMENT REGARDING FEDERALLY SPONSORED RESEARCH OR DEVELOPMENT

This invention was made with United States Government support under Agreement No. 2013-12101100008. The government has certain rights in the invention.

BACKGROUND

Analysts are often on alert for sudden changes in a tactical situation, where reaction timelines are short and cost of inaction is high. However, in today's world, information is easy and inexpensive to collect and stream to users. The volume and velocity of streaming information precludes human consumption; there is just too much of it for an analyst to read on one's own. This constraint is applicable to various fields, such as law enforcement, counter-terrorism, and finance, for example. In each of these, as well as other fields, analysts need to stay ahead of a problem, but there is simply too much information to do so.

At the same time, statistical entity and relation extraction systems have made enormous strides in detecting less-obvious relationships between key entities hidden in massive volumes of unstructured text. This functionality makes it possible for an analyst to operate with a much clearer vision over networks operating in one's sphere of interest. For example, systems that reveal a previously unknown connection between entities, possibly linked to the evidence supporting the connection, have enabled deeper understanding of a problem space.

Thus, advances in entity and relation extraction offer a solution to the problem of data overload.

SUMMARY

Embodiments are directed to an approach utilizing relationship extraction as a seed resource for filtering streaming information to detect and extract potentially relevant information from streaming feeds. According to embodiments provided herein, the approach does not require human intervention or any form of scoring or machine learning algorithms.

According to embodiments, a computer-implemented method, system, and computer program product are provided for filtering streaming information. The system includes a processor coupled to one or more data sources, one or more user devices, and a static corpus, the processor configured to filter streaming information. The computer program product comprises a computer readable storage medium having program instructions embodied therewith, the program instructions executable by a processor. The processor is configured to implement the computer-implemented method of: running a statistical relationship extractor over a static corpus, resulting in a plurality of extracted entities and associated relationship information; creating a knowledge graph using the extracted entities and the associated relationship information; identifying a seed, wherein the seed is one of the extracted entities in the knowledge graph; extracting from the knowledge graph, detected relationships and other entities connected to the seed, resulting in exported information; using the exported information to set up a filter for streaming information such that information pertaining to any entity connected to the seed is flagged, resulting in flagged information; aggregating the flagged information into an ordered read queue; incrementally ingesting documents screened by the filter, resulting in an update; and using the update to update the knowledge graph.

Additional features and advantages are apparent from the following detailed description that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

Figure 1:
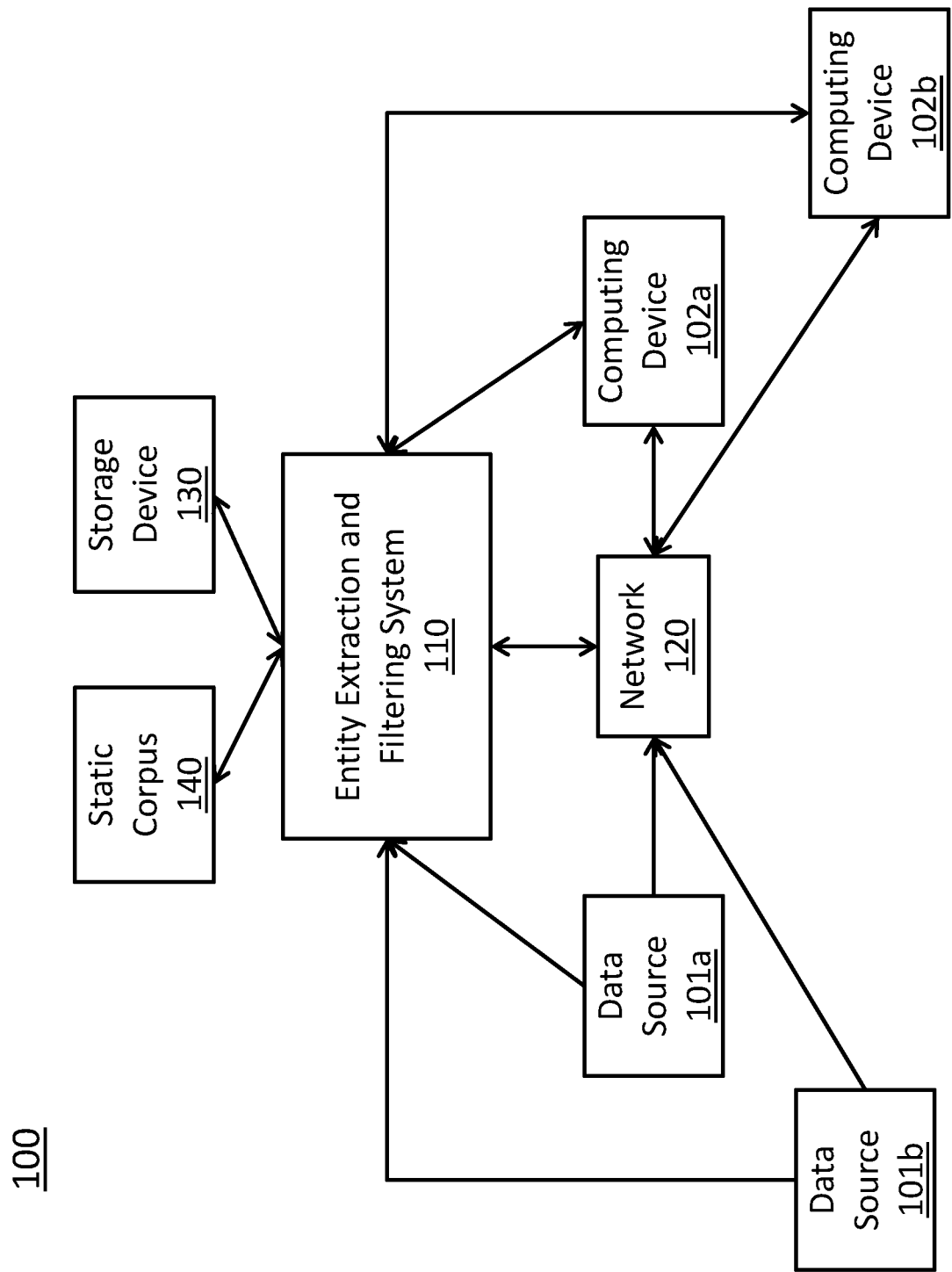
FIG. 1 is a diagram depicting a system in which an entity extraction and filtering system may be implemented, according to embodiments herein.

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present invention.

According to embodiments disclosed herein, relationship extraction is utilized as a seed resource for filtering streaming information, resulting in detection and extraction of potentially relevant information from streaming feeds. According to embodiments provided herein, the approach advantageously does not require human intervention or any form of scoring or machine learning algorithms. The statistically extracted relationship information is of enormous intrinsic value as the approach provides a secondary use for these relationships to support intelligent filtration of streaming information for real-time alerts.

According to an embodiment, an entity extraction and filtering system enables a close search of documents, that may include millions of documents, to build filters necessary for near real-time monitoring of streaming sources of information. According to an embodiment, the entity extraction and filtering system operates based on the following parameters. First, a detection of an entity of interest warrants flagging an arriving article for analyst attention. Nothing more than a match is required, according to an embodiment. The list of entities may be derived by an entity extractor from a corpus of data. Secondly, automatic updates may be utilized, so that exports are automatically updated to the filters. Thirdly, information flowing past the filters may, according to an embodiment, update a static corpus whether or not they are flagged for an analyst or user. This allows for new relationships to be detected and extracted, and the filters subsequently updated.

FIG. 1 is a diagram depicting a system 100 in which an entity extraction and filtering system 110 may be implemented, according to embodiments herein. The system 100 includes the entity extraction and filtering system 110 coupled directly or via a network 120 to various data sources 101a, 101b and to various computing devices 102a, 102b. Each data source 101a, 101b may be any type of information source available to analysts or other users to obtain information. Each device 102a, 102b may be a user computing device to which one or more real-time or near real-time alerts is provided from the entity extraction and filtering system 110. Additional or fewer data sources 101 and devices 102 may be included in the system 100. A storage device 130 and a static corpus 140 coupled to the entity extraction and filtering system 110 are also provided in the system 100. The storage device 130 receives and stores information related to, for example, the entity extraction and filtering system 110, the data sources 101a, 101b, and/or the user devices 102a, 102b. The static corpus 140 contains a collection of information, as further described herein.

According to an embodiment, the entity extraction and filtering system 110 comprises one or more processors and/or modules for implementing functionality to filter streaming information for real-time alerts, as further described in accordance with embodiments herein.

Figure 2:
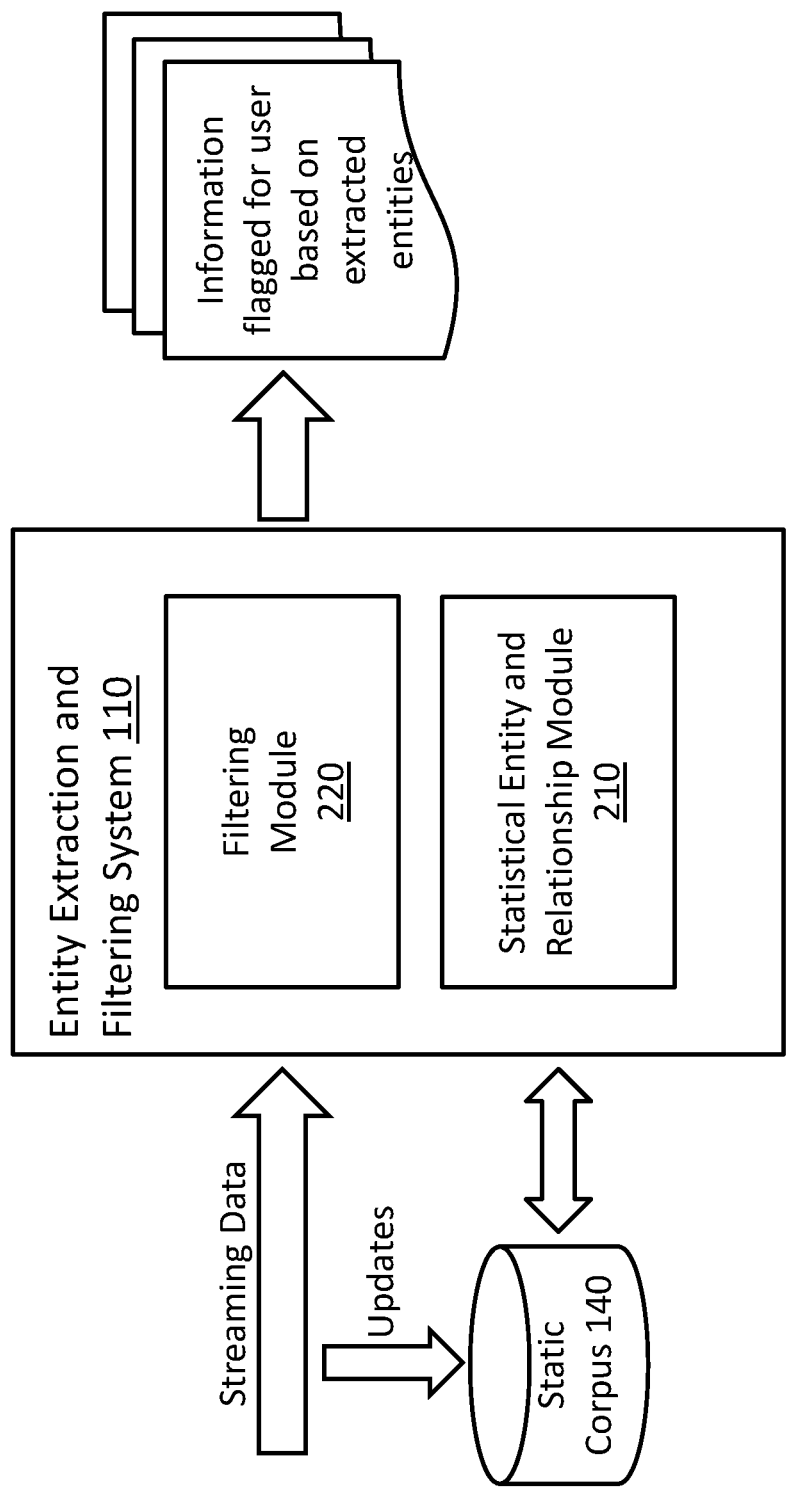
FIG. 2 is a block diagram illustrating components of an entity extraction and filtering system, according to embodiments herein.

FIG. 2 is a block diagram illustrating components of the entity extraction and filtering system 110, according to embodiments herein. As shown in FIG. 2, the entity extraction and filtering system 110 includes a statistical entity and relationship module 210 and a filtering module 220. The functionality of the entity extraction and filtering system 110 is described with reference to FIG. 2.

The statistical entity and relationship module 210 runs a statistical relationship extractor over the static corpus 140 to extract entities and relationship information to create a knowledge graph.

Separately, in an embodiment, an identification step is done to identify entities likely to be at the center of networks of interest. For example, directors of a corporation or senior staff at a government agency may comprise or be a part of a group of identified entities.

From the ingested knowledge graph, an extraction step is done to extract detected relationships and entities connected to a seed, which is identified in the previous identification step (i.e., one of the extracted entities in the knowledge graph) (1-removed entities). The extraction step may, according to an embodiment, be repeated to obtain further distantly-related entities (n-removed entities). The results comprise exported information.

The exported information is utilized to set up filters for streaming information, resulting in information that pertains to any entity connected to the seed is flagged. The filters, according to embodiments provided herein, rapidly extract and flag for attention information relevant to a user. The extracting and flagging occur in near real-time, thereby reducing a reaction timeline for time-sensitive information. Furthermore, reliance on a Boolean search over a static corpus is eliminated.

The flagged information is collected into an ordered queue for the user. In an embodiment, the order may be temporal based, first-in-first-out. In an alternate embodiment, a more complex prioritization function may be employed for the ordering; for example, with a term reflecting a match to the filter-score (entity term), along with an optional recency term, an optional source reliability term, and potentially other relevant terms. For an entity term, seed entities are given a weight of one, and n-removed entities are given a weight of $1/n+1$. In an embodiment, a recency term is defined as $1/(\text{current timestamp}-\text{information timestamp})$. For a source reliability term, some sources may have a manually assigned or a learned reliability score (e.g., a Wall Street Journal article may be higher than a Facebook post). In an embodiment, the terms are combined. For example, the terms may be combined in a linear combination: $c1$ (entity term)$+c2$ (recency term)$+c3$ (source reliability term). Flagged information thus may receive a prioritization score and is inserted into a prioritized queue at a position determined by the prioritization score. Other prioritization functions may be utilized to determine a prioritization score for flagged information.

After the ordering, at a regular and/or predefined interval, the entity extraction and filtering system 110 incrementally ingests documents that have been screened by the filter to update the coverage of the knowledge graph.

Figure 3:
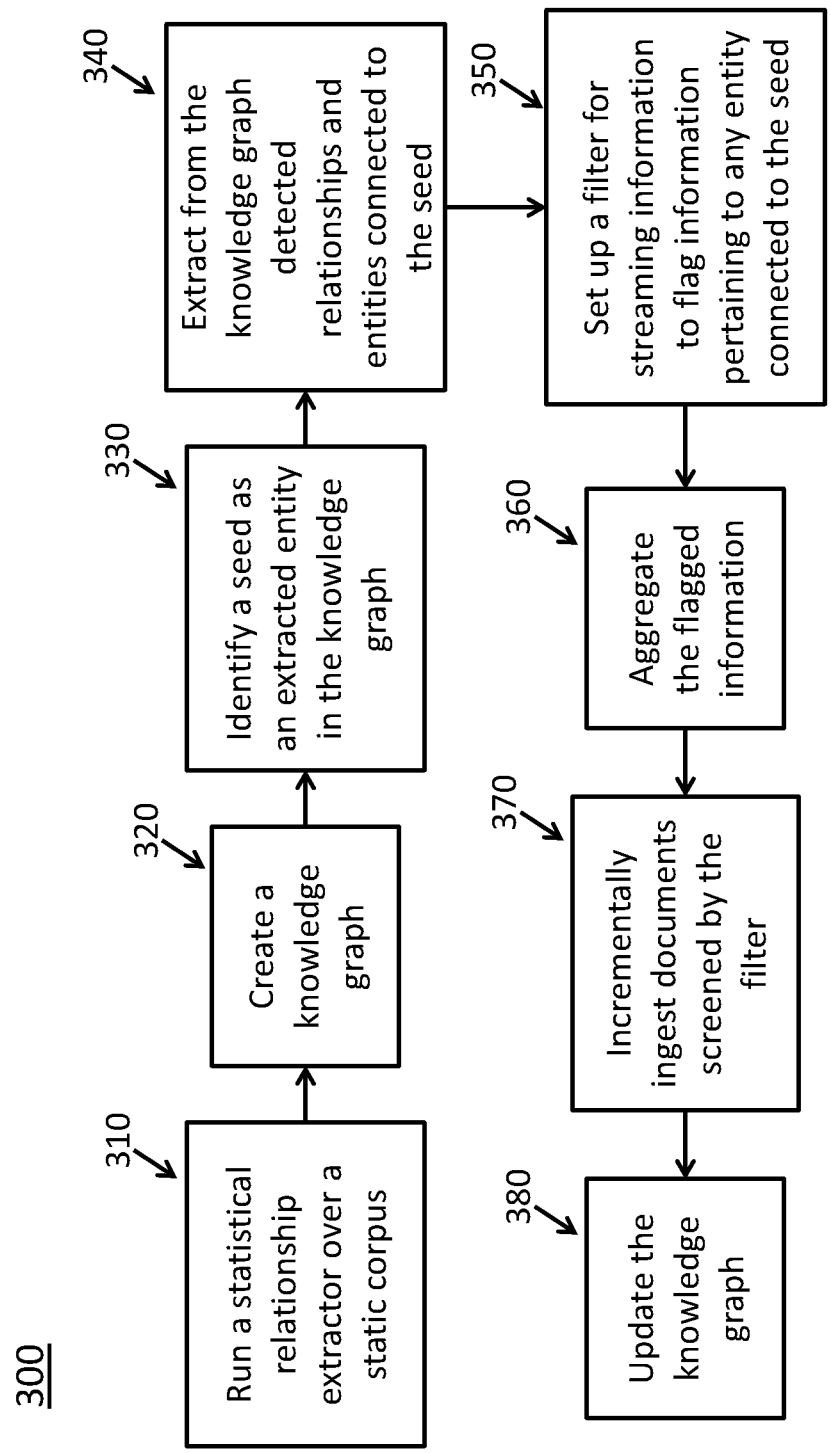
FIG. 3 is a flowchart illustrating a method for filtering streaming information, according to embodiments herein.

FIG. 3 is a flowchart 300 illustrating a method for filtering streaming information, according to embodiments herein.

At 310, a statistical relationship extractor over a static corpus is run by the entity extraction and filtering system 110, resulting in a plurality of extracted entities and associated relationship information.

At 320, the entity extraction and filtering system 110 creates a knowledge graph using the extracted entities and the associated relationship information.

At 330, the entity extraction and filtering system 110 identifies a seed, wherein the seed is one of the extracted entities in the knowledge graph.

At 340, the entity extraction and filtering system 110 extracts from the knowledge graph detected relationships and other entities connected to the seed, resulting in exported information.

At 350, the entity extraction and filtering system 110 uses the exported information to set up a filter for streaming information such that information pertaining to any entity connected to the seed is flagged, resulting in flagged information.

At 360, the entity extraction and filtering system 110 aggregates the flagged information into an ordered read queue.

At 370, the entity extraction and filtering system 110 incrementally ingests documents screened by the filter, resulting in an update.

Finally, at 380, the entity extraction and filtering system 110 uses the update to update the knowledge graph.

The entity extraction and filtering system 110, according to embodiments herein, is advantageous over a manual compilation of filters because it presupposes no complete knowledge of important relationships between entities. Instead, the entity extraction and filtering system 110 allows Natural Language Processing (NLP) technology to isolate every relationship contained in the corpus, and automatically builds the filters for culling critical information from streaming data. In this way, the entity extraction and filtering system 110 detects relationships that are not obvious and known to human analysts, as well as those that may have been concealed.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatuses (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
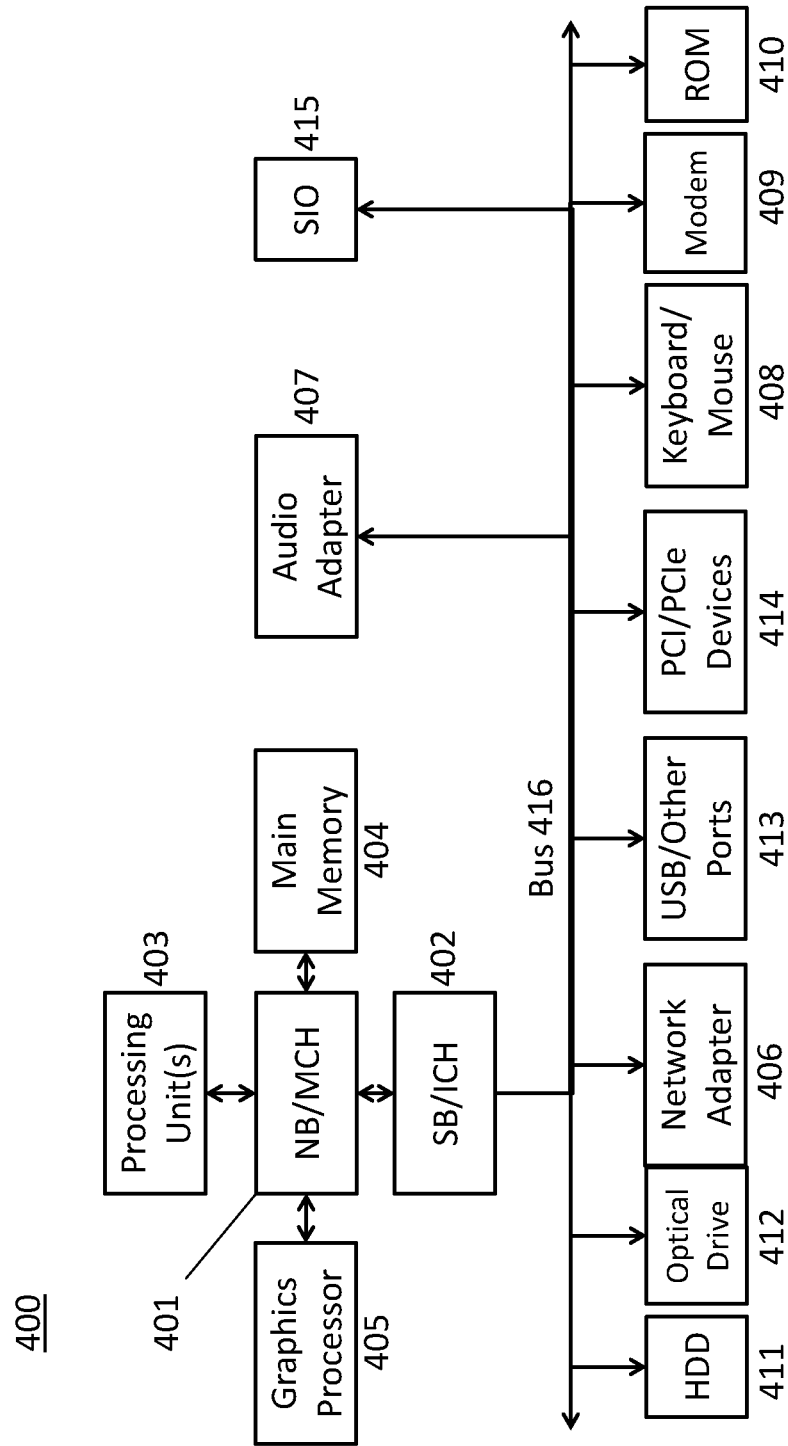
FIG. 4 is a block diagram of an example data processing system in which aspects of the illustrative embodiments may be implemented.

FIG. 4 is a block diagram of an example data processing system 400 in which aspects of the illustrative embodiments are implemented. Data processing system 400 is an example of a computer, such as a server or client, in which computer usable code or instructions implementing the process for illustrative embodiments of the present invention are located. In one embodiment, FIG. 4 may represent a server computing device.

In the depicted example, data processing system 400 can employ a hub architecture including a north bridge and memory controller hub (NB/MCH) 401 and south bridge and input/output (I/O) controller hub (SB/ICH) 402. Processing unit 403, main memory 404, and graphics processor 405 can be connected to the NB/MCH 401. Graphics processor 405 can be connected to the NB/MCH 401 through, for example, an accelerated graphics port (AGP).

In the depicted example, a network adapter 406 connects to the SB/ICH 402. An audio adapter 407, keyboard and mouse adapter 408, modem 409, read only memory (ROM) 410, hard disk drive (HDD) 411, optical drive (e.g., CD or DVD) 412, universal serial bus (USB) ports and other communication ports 413, and PCI/PCIe devices 414 may connect to the SB/ICH 402 through bus system 416. PCI/PCIe devices 414 may include Ethernet adapters, add-in cards, and PC cards for notebook computers. ROM 410 may be, for example, a flash basic input/output system (BIOS). The HDD 411 and optical drive 412 can use an integrated drive electronics (IDE) or serial advanced technology attachment (SATA) interface. A super I/O (SIO) device 415 can be connected to the SB/ICH 402.

An operating system can run on processing unit 403. The operating system can coordinate and provide control of various components within the data processing system 400. As a client, the operating system can be a commercially available operating system. An object-oriented programming system, such as the Java™ programming system, may run in conjunction with the operating system and provide calls to the operating system from the object-oriented programs or applications executing on the data processing system 400. As a server, the data processing system 400 can be an IBM® eServer™ System p® running the Advanced Interactive Executive operating system or the Linux operating system. The data processing system 400 can be a symmetric multiprocessor (SMP) system that can include a plurality of processors in the processing unit 403. Alternatively, a single processor system may be employed.

Instructions for the operating system, the object-oriented programming system, and applications or programs are located on storage devices, such as the HDD 411, and are loaded into the main memory 404 for execution by the processing unit 403. The processes for embodiments described herein can be performed by the processing unit 403 using computer usable program code, which can be located in a memory such as, for example, main memory 404, ROM 410, or in one or more peripheral devices.

A bus system 416 can be comprised of one or more busses. The bus system 416 can be implemented using any type of communication fabric or architecture that can provide for a transfer of data between different components or devices attached to the fabric or architecture. A communication unit such as the modem 409 or the network adapter 406 can include one or more devices that can be used to transmit and receive data.

Those of ordinary skill in the art will appreciate that the hardware depicted in FIG. 4 may vary depending on the implementation. Other internal hardware or peripheral devices, such as flash memory, equivalent non-volatile memory, or optical disk drives may be used in addition to or in place of the hardware depicted. Moreover, the data processing system 400 can take the form of any of a number of different data processing systems, including but not limited to, client computing devices, server computing devices, tablet computers, laptop computers, telephone or other communication devices, personal digital assistants, and the like. Essentially, data processing system 400 can be any known or later developed data processing system without architectural limitation.

The system and processes of the figures are not exclusive. Other systems, processes, and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes can be implemented using hardware components, software components, and/or combinations thereof. No claim element herein is to be construed under the provisions of 35 U.S.C. 112(f) unless the element is expressly recited using the phrase "means for."

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

We claim:

1. A computer-implemented method for filtering streaming information, the method comprising:

running, at a processor coupled to one or more sources of data and to a static corpus, a statistical relationship extractor over the static corpus, resulting in a plurality of extracted entities and associated relationship information, wherein the extracted entities are human entities;

creating, by the processor, a knowledge graph using the extracted entities and the associated relationship information;

identifying, by the processor, a seed, wherein the seed is one of the extracted entities in the knowledge graph;

extracting, by the processor, from the knowledge graph, detected relationships and other entities connected to the seed, resulting in exported information;

using, by the processor, the exported information to set up a filter for streaming information such that information pertaining to any entity connected to the seed is flagged, resulting in flagged information;

aggregating, by the processor, the flagged information into an ordered read queue based on an entity term, a recency term derived from an information timestamp, and a source reliability term having a reliability score, wherein the entity term, the recency term, and the source reliability term are combined in a linear combination to receive a prioritization score for placement in the ordered read queue;

incrementally ingesting, by the processor, documents screened by the filter, resulting in an update; and using, by the processor, the update to update the knowledge graph.

2. The method of claim 1, further comprising:

repeating, by the processor, extracting from the knowledge graph to obtain further distantly-related entities to be included in the exported information.

3. The method of claim 1, wherein the information pertaining to any entity connected to the seed is flagged in near real-time.

4. The method of claim 1, wherein the one of the extracted entities identified as the seed is statistically likely to be at a center of networks of interest.

5. The method of claim 1, wherein aggregating the flagged information into an ordered read queue comprises ordering the flagged information in a first-in-first-out order.

* * * * *